United States Patent Office 2,853,524
Patented Sept. 23, 1958

2,853,524

PERCHLOROFLUOROACETONES AND PRODUCTION THEREOF

Charles B. Miller and Cyril Woolf, Morristown, N. J., assignors to Allied Chemical & Dye Corporation, New York, N. Y., a corporation of New York No Drawing. Application March 14, 1955
Serial No. 494,237

12 Claims. (Cl. 260—593)

This invention is directed to perhalogenated fluoroacetones and to methods for making the same.

Objects of the invention are more particularly to provide perchlorofluoroacetones containing at least one fluorine atom and at least one chlorine atom, and to provide processes for making such acetones.

Products of the invention may be designated as perchlorofluoroacetones containing 1 to 5 inclusive fluorine atoms per mol, i. e. $C_3OCl_{6-x}F_x$ where $x$ is an integer from 1 to 5, and mixtures thereof. The invention comprises such compounds and certain methods for making the same. The compounds indicated are valuable chemical intermediates, and constitute raw materials for manufacture of various fluorine containing products in operations not part of this invention.

One feature of the invention lies in the discovery of a particular class of compounds which may be used as starting materials in the hereindescribed manufacture processes which result in formation of the new products. In accordance with the present improvements, it has been found that such new products may be obtained from a relatively specific class of starting materials which do not contain hydrogen and hence are defined herein as perhalogenated acetones. In the broader aspects of the invention, the starting materials or compounds are compounds of the group consisting of $CCl_3.CO.CCl_3$, $CFCl_2.CO.CCl_3$, $CFCl_2.CO.CFCl_2$, $CF_2Cl.CO.CCl_3$, $CFCl_2.CO.CF_2Cl$, $CF_3.CO.CCl_3$, $CF_2Cl.CO.CF_2Cl$, and $CF_3.CO.CCl_2F$, and mixtures thereof. These materials are perhalogenated chloroacetones containing zero to not more than 4 fluorine atoms, and wherein all halogens are of the group consisting of chlorine and fluorine. In one embodiment of the invention, the starting material is hexachloroacetone, $CCl_3.CO.CCl_3$, a liquid under normal conditions and having a boiling range of 202–204° C., the hexachloroacetone being a particularly preferred starting material for manufacture of $CFCl_2.CO.CCl_3$, $CFCl_2.CO.CFCl_2$, $CF_2Cl.CO.CFCl_2$, $CF_2Cl.CO.CF_2Cl$, and $CF_3.CO.CF_2Cl$.

Partially chlorofluorosubstituted acetones such as $CClH_2.CO.CF_3$, are known. An important factor of the invention lies in the discovery that the indicated starting materials should contain no hydrogen. It has been found that, when proceeding in accordance with the process aspects of the invention, any attempt to use starting materials containing any hydrogen, results in formation of substantially none of the herein sought-for products, but on the other hand causes vigorous decomposition of the hydrogen containing starting material with formation of unwanted compounds such as phosgene, carbon monoxide, halogenated methane derivatives, and resinous tars. Thus, when 2.0 mols $SbF_3$, 0.2 mol $SbCl_5$, and 2.0 mols of $CHCl_2.CO.CCl_3$ were charged to a flask provided with agitation and the mixture heated gently, extensive gas evolution occurred. This gas contained some HF which was scrubbed out of water. The scrubber tail gas was dried with "Drierite," but was found to be uncondensable at minus 70° C. When the reaction temperature reached 100° C., a black resinous, tarry mass was left in the reaction vessel. Hence, the invention starting materials are perhalogenated acetones containing no hydrogen. As to selection of suitable starting material, another feature is fluorine content. While starting material containing some fluorine may be employed, the perhalogenated acetones utilized as starting materials contain not more than 4 fluorine atoms. Accordingly, the perhalogenated starting material may contain as much as 4 fluorine atoms, the balance of halogen being chlorine.

It will be understood that if a compound such as monofluoropentachloroacetone ($CFCl_2.CO.CCl_3$) is utilized as starting material, practice of the invention results in a product which contains at least two atoms of fluorine, e. g. difluorotetrachloroacetone ($CFCl_2.CO.CFCl_2$), and may contain as much as 5 fluorine atoms, i. e. pentafluoromonochloroacetone ($CF_3.CO.CClF_2$). Similarly, if the starting material is trifluorotrichloroacetone $$(CFCl_2.CO.CF_2Cl)$$

the product obtained therefrom contains more fluorine and may be tetrafluoromonochloroacetone, $CF_2Cl.CO.CF_2Cl$. While as indicated suitable starting materials contain the described varying combinations of chlorine and permissibly fluorine, the current commercially important raw material most adaptable for use as a starting material is hexachloroacetone, and thus for convenience the invention is described herein largely in connection with use of hexachloroacetone as the starting material.

Procedurally, a preferred embodiment of the invention comprises fluorinating the particular indicated starting materials under certain hereinafter described conditions to effect formation of the particular indicated perchlorofluoroacetone products wherein the fluorine content is greater than that of said starting material.

It is noted that the above described starting materials are oxygenated. The thought has prevailed in the art that the fluorination of oxygenated materials by the Swarts type of reaction, which particularly and currently involves use of pentavalent antimony fluorohalides, has been either impossible or at least commercially completely unsatisfactory because of decomposition which would result almost totally in formation of unwanted oxygen and non-oxyen containing compounds. Contrary to the foregoing and to expectation, and in accordance with a further feature of the invention it has been found that, provided selection of starting material is made as taught herein, it is possible to fluorinate these particular oxygen containing starting materials to obtain the hereindescribed new products, with very little if any decomposition of either starting material or products formed, by a Swarts-like reaction provided however that the starting material and a fluorinating agent are reacted in the presence of herein described antimony pentahalides as distinguished from other fluorinating catalysts or reaction promoters, and further provided that this particular antimony salt is present in certain proportions with respect to the amount of starting material employed. The antimony salt is particularly effective to bring about further fluorination of starting materials such as $CCl_3.CO.CCl_3$, $CCl_2F.CO.CCl_3$, $CCl_2F.CO.CCl_2F$, $CClF_2.CO.CCl_2F$, $CF_3.CO.CCl_3$, and $CClF_2.CO.CClF_2$ to form more fluorinated products such as $CCl_2F.CO.CCl_3$, $CCl_2F.CO.CCl_2F$, $CClF_2.CO.CCl_2F$, $CClF_2.CO.CClF_2$, $CF_3.CO.CCl_2F$, and $CF_3.CO.CClF_2$. Hence, according to one phase of the invention, largely by reason of the present discovery of a specific class of starting materials and the discovery of the interdependent relationship of particular starting materials and the presence of certain quantities of antimony pentahalide, it becomes possible not only to make the new products, but also it is possible and commercially feasible to effect such manufacture by relatively easily controllable procedures heretofore thought to be inapplicable to oxygenated starting materials.

The preferred fluorinating agent used is substantially anhydrous hydrogen fluoride, employed generally as a gas. Fluorine also may be supplied to the reaction in the form of trivalent antimony fluoride $SbF_3$. In large scale operations, combinations of HF and $SbF_3$ may be employed, particularly where it is desired to carry out the reactions at temperatures near the upper end of the herein disclosed temperature range. In such instances, the quantity of $SbF_3$ used preferably should be such that at least about 60 mol percent of total fluorine consumed in a given reaction is supplied thereto in the form of $SbF_3$.

The antimony pentahalide employed is a liquid material which is defined as one whose composition may be expressed by the empirical formula—$SbF_xCl_{5-x}$, in which $x$ is a value of five or less and may be zero, but is generally within the approximate range of 1–3. Materials of this nature may be prepared by passing HF into e. g. antimony pentachloride until the product contains fluorine e. g. in the range of about 5 to 20% by weight. In this specification and appended claims, for convenience, the expression "antimony pentahalide" is used to define materials designated by the foregoing general formula. During use of these substances in a fluorination reaction, there is mutual exchange of chlorine and fluorine between starting material and such substances, and fluorine consumed is supplied to the operation in the form of HF and/or $SbF_3$.

As indicated above, products of the invention are as follows:

Monofluoropentachloroacetone—$CFCl_2.CO.CCl_3$—B. P. 163–166° C.

Sym-difluorotetrachloroacetone—$CFCl_2.CO.CFCl_2$—B. P. 118–122° C.

Asym-difluorotetrachloroacetone—$CF_2Cl.CO.CCl_3$—B. P. about 120° C.

Trifluorotrichloroacetone—$CCl_2F.CO.CClF_2$—B. P. about 84° C.

Asym - trifluorotrichloroacetone—$CF_3.CO.CCl_3$—B. P. about 84° C.

Sym-tetrafluorodichloroacetone—$CClF_2.CO.CClF_2$—B. P. about 44° C.

Asym-tetrafluorodichloroacetone—$CF_3.CO.CCl_2F$—B. P. about 44° C.

Pentafluoromonochloroacetone—$CF_3.CO.CClF_2$—B. P. 7–11° C.

In general, precedural practice of one embodiment of the invention comprises reacting at elevated temperature the indicated starting materials with a fluorinating agent while in the presence of antimony pentahalide in certain proportions with respect to the amount of starting material, while maintaining the starting material substantially in the liquid phase, and for a time period sufficient to effect fluorination of such amount of starting material to cause formation of the particularly desired perchlorofluoroacetone products which each contain more fluorine than did the particular starting material used.

The perchloro- or perchlorofluoroacetone starting material is introduced batchwise or continuously into a suitable reactor and mixed therein with antimony pentahalide. Broader objects of the invention may be attained if the quantity of antimony pentahalide is employed in an amount at least about 5 mol percent based on the total starting material and antimony pentahalide. The product formation results of the instant improvements have been found to be coordinately related to the molar proportions of starting material and antimony pentahalide. In order to form any significant quantity of the new products, we find that at least about 5 mol percent of antimony pentahalide should be employed, based on the total of starting material and antimony pentahalide. For production of the higher fluorinated acetones, greater molar proportions of pentavalent antimony salt are desirable. For purposes of the invention the antimony pentahalide need not be present in amount substantially greater than 60 mol percent.

Generally speaking, the relative quantity of antimony pentahalide appears to have a somewhat but not apparently direct proportional relation to the fluorine content of the sought-for end product. Thus, other operating factors being substantially equal, it appears that in the manufacture of reaction products containing a dominant amount of perchlorofluoroacetones having three or more fluorine atoms, i. e. the preferred products of the invention, the antimony pentahalide should be present in amount substantially in the range of about 25–60 mol percent, based on the total of starting material and antimony pentahalide. For formation of end products containing dominant amounts of perchlorofluoroacetones containing not more than two fluorine atoms, the better results are obtainable if the antimony pentahalide is present in amount substantially in the range of about 5–25 mol percent, preferably about 5–15%.

Reaction temperatures, at the preferably atmospheric pressure operating conditions, may be any relatively low but somewhat elevated temperature high enough to effect significant reaction. Overall temperatures lie substantially in the range of 30–200° C., the preferred temperatures being not higher than about 150° C., and ordinarily in the range of 60–150° C. If super-atmospheric reaction pressures are desired, correspondingly higher temperatures may be employed. However, at atmospheric pressure if temperatures above 150° C. are desired, it is well to maintain in the reactor the presence of some substantial amount of $SbF_3$ in order to prevent excessive dechlorination of the pentavalent antimony compound, and if temperatures as high as 200° C. are employed, the reactor may contain $SbF_3$ in amount which supplies to the reactor at least about 60 mol percent of the total fluorine employed. In the better embodiments, reaction temperatures above 175° C. at atmospheric pressure are not employed, and fluorine added to the system is supplied in the form of anhydrous HF gas.

Operation of the reactor is such that the particular starting material is maintained during the reaction phase substantially in the liquid phase. To make any particular product, refluxing may be utilized in any desirable instance to increase production of such product. In the manufacture of the lower boiling products, i. e. the 3 and higher fluorine atom materials, the reactor may be connected to a fractionating column provided with a reflux condenser the gas outlet of which is operated to permit substantially only HCl to pass through. By regulation of reflux and diminution or extension of the reaction time, reaction products dominating in a particular desired end product may be obtained. The sought-for products may then be recovered as the liquid effluent of the fractionating tower, and isolated from each other as by fractional distillation. When the higher boiling $CFCl_2.CO.CFCl_2$ and/or $CFCl_2.CO.CCl_3$ end products are desired, the described 5–15 mol percent ratio preferably may be used, and the reaction is carried out under reflux for a time interval long enough to cause formation of the desired product. Thereafter, a small amount of e. g. 15–20% aqueous hydrochloric acid may be added to the mass in the reactor to effect extraction of the antimony halide, and the supernatant layer of aqueous hydrochloric acid containing antimony decanted off. Residual liquor may be dried as by anhydrous sodium sulfate, and $$CFCl_2.CO.CFCl_2$$

or $CFCL_2.CO.CCl_3$ or both recovered by distillation.

Fluorinating agent is employed in quantity to provide at least a stoichiometric sufficiency of fluorine for the desired end product, continuous feed of HF gas to the reactor being preferred. Other conditions being relatively equal, time of reaction is mostly dependent upon the degree of fluorination to be effected, and such time may vary e. g. from half to several hours. For formation of a reaction product dominantly a sought-for chlorofluoroacetone, optimum reaction time may be determined by a test run.

The following examples illustrate practice of the invention:

Example 1.—530 grams of hexachloroacetone were added continuously during a period of 5 hours to an agitated reactor mixture of 792 grams of $SbF_3$ and 792 grams of $SbCl_5$ maintained at 120–140° C. The total of organic starting material and antimony pentahalide charged contained about 57 mol percent of the latter, in this instance as $SbCl_5$. Vapors from the reaction vessel were condensed by a water cooled condenser, and subjected to fractional distillation. From the reaction product, 225 grams (66% yield) of $CClF_2.CO.CClF_2$, B. P. 44° C., were isolated.

Example 2.—260 grams of hexachloroacetone, 23 grams (10 cc.) of $SbCl_5$, and 360 grams of $SbF_3$, were heated in a reactor at temperature of about 140° C. and refluxed for 30 minutes. The total of organic starting material and antimony pentahalide charged contained about 7 mol percent of the latter. The reaction product was cooled, and the supernatant product decanted from unreacted fluorinating agent and catalyst. Fractional distillation resulted in recovery of 110 grams of $$CCl_2F.CO.CCl_2F$$

B. P. 118°–122° C., together with some higher fluorinated acetones.

Example 3.—360 grams of $SbF_3$, 300 grams of $SbCl_5$, and 264 grams of hexachloroacetone were heated in a reactor the exit of which was connected with a fractionating still. The total of organic starting material and antimony pentahalide charged contained about 50 mol percent of the latter. Reaction was allowed to proceed at temperature of 105°–110° C. for 2 hours, and then the product was distilled out during 3 hours until the still pot temperature reached 190° C. Refractionation of product yielded mainly $CCl_2F.CO.CClF_2$, B. P. 84.2° C. (133 g.=62% yield), $CClF_2.CO.CClF_2$, B. P. 44° C., (59 g.=29% yield), and $CF_3.CO.CClF_2$, B. P. 7–11° C., (6 g.=4% yield).

Example 4.—1060 grams of hexachloroacetone and 571 grams of $SbCl_5$ were charged to a steel reactor connected with a fractionating column and reflux condenser cooled with ice water. The total of organic starting material and antimony pentahalide charged contained about 32 mol percent of the latter. HF was fed to the reactor initially maintained at 90° C. for 17 hours when the reaction temperature fell to 72° C. due to reflux of lower boiling perchlorofluoroacetones. Exit gas was partially condensed in a steel trap immersed in acetone-Dry Ice mixture and the residual HCl, 15.2 mols, was taken up in water. Reaction products were then distilled from the reactor until a pot temperature of 140° C. was reached. Product condensed in the acetone-Dry Ice trap was fractionally distilled to remove unreacted HF, and the still pot residue was combined with the main organic reaction products from the trap and the combined materials were then subjected to fractional distillation. 285 grams of $CClF_2.CO.CClF_2$ and 410 grams of $$CClF_2.CO.CCl_2F$$

were recovered.

Example 5.—530 grams of hexachloroacetone and 30 grams of $SbCl_5$ were charged to a reactor. The total of organic starting material and antimony pentahalide charged contained about 5 mol percent of the latter. The mass was gassed with HF for about 8 hours at temperature of about 110° C. until 1.6 mols of HCl had been formed. The reaction product was washed with small portions of 20 weight percent HCl to remove antimony halide, dried, and fractionated to recover 420 grams $CCl_3.CO.CCl_2F$, B. P. 163–166° C.

Example 6.—431 grams (2 mols) of $CCl_2F.CO.CClF_2$ were charged to a reactor with 299 grams (1 mol) of $SbCl_5$ and gassed with HF at 70–80° C. for about 6 hours The total of organic starting material and antimony pentahalide charged contained about 33 mol percent of the latter. The vapors from the reaction vessel were condensed, residual HF was separated therefrom, and the residue was subjected to fractional distillation to recover $CClF_2.CO.CClF_2$.

Example 7.—In an agitated steel pot 1170 grams of $SbCl_5$ were gassed with 50 grams of HF at 90° C. Thereafter, HF at the rate of about 1 mol per hour and hexachloroacetone at the rate of about 0.2 mol per hour were continuously fed to the catalyst at temperature of about 90° C. The total of organic starting material and antimony pentahalide charged contained about 44 mol percent of the latter. The exit vapors from the reactor were led to a still fitted with a reflux condenser which was cooled with acetone-Dry Ice mixture and which allowed HCl formed by reaction to pass through while retaining other products. Initially the HF conversion was 84% falling to 70% in 25 hours. The product isolated during this run were $CClF_2.CO.CCl_2F$ (446 g.), $CCl_2F.CO.CCl_2F$ (300 g.), and $CClF_2.CO.CClF_2$ (104 g.).

Example 8.—183 grams of liquid, substantially colorless $CF_3.CO.CClF_2$ (B. P. 7–11° C. and made e. g. as in Example 3) were slowly dripped during a period of about 4 hours into a flask containing 100 grams of anhydrous powdered $AlCl_3$. The flask was immersed in an oil bath maintained at 60° C., and was connected to an ice-cooled reflux condenser. Subsequent to addition of the ketone, reflux was continued for an additional 6 hours with increased reactor temperature up to about 75° C. Then substantially all of the liquid contents of the flask were distilled away from the aluminum halides. The resulting condensate was fractionated. Some unreacted $$CF_3.CO.CClF_2$$

starting material was boiled off as heads and recovered. Thereafter, an overhead having a vapor temperature of about 83–85° C. distilled over, and 120 grams of substantially colorless liquid identified as $CF_3.CO.CCl_3$ and having a boiling point of about 83.5–84.5° C. were recovered.

Example 9.—42 grams of liquid, substantially colorless $CClF_2.CO.CCl_2F$ (B. P. 84.2° C. and made e. g. as in Example 4) were mixed with 4 grams of anhydrous, powdered $AlCl_3$ in a reactor equipped with a reflux condenser. During mixing, the materials in the reactor were cooled by external cooling to dissipate exothermic heat of reaction and keep temperature of the mass substantially below the boiling point of the organic starting material. On completion of mixing, the mass in the reactor was heated to temperature of about 90–95° C. for about 4 hours under total reflux conditions. Then substantially all of the reactor liquor was distilled out to separate the same from aluminum halides. The resulting condensate was fractionally distilled. Initially some unreacted $CClF_2.CO.CCl_2F$ starting material was boiled off and recovered. Thereafter, an overhead having a vapor temperature of about 118–122° C. distilled over, and 12.3 grams of a substantially colorless liquid identified as $CClF_2.CO.CCl_3$ and having a boiling point of about 120° C. were recovered.

Example 10.—400 grams of liquid, substantially colorless $CClF_2.CO.CClF_2$ (B. P. 44° C. and made e. g. as in Example 4) were mixed with 60 grams of anhydrous, powdered $AlCl_3$ in a reactor provided with a reflux condenser regulated to effect total refluxing of the evolved vapors. Reaction was exothermic and refluxing spontaneously occurred. Without application of external heat, exothermic heat maintained continuance of reaction for about an hour, after which refluxing subsided. Substantially all of the liquor in the reactor was then distilled away from the aluminum halides, and the total condensate thus recovered was fractionated. Some unreacted CClF₂.CO.CClF₂ starting material was boiled off as heads and recovered. Thereafter, an overhead having a vapor temperature of about 118–122° C. distilled over, and 76 grams of a substantially colorless liquid identified as CClF₂.CO.CCl₃ and having a boiling point of about 120° C. were recovered.

*Example 11.*—120 grams of liquid, substantially colorless CF₃.CO.CCl₃ (B. P. 83.5–84.5° C. and made e. g. as in Example 8), 100 grams of SbF₃, and 93 grams of SbCl₅ were charged into a reactor connected to a fractionating column and a reflux condenser. The total of organic starting material and antimony pentahalide charged contained about 36 mol percent of the latter. The mass in the reactor was heated at temperature of about 95–100° C. Reflux conditions were adjusted so as to effect slow discharge from the reflux condenser of a fraction boiling at about 43–46° C. This condensate was redistilled, and 70 grams of substantially colorless liquid identified as CF₃.CO.CCl₂F and having a boiling point of about 44° C. were recovered.

The following examples are illustrative of some uses of the herein new compounds. In the processes of these particular examples it appears that reactions involved proceed in accordance with the following illustrations:

(Equation A)

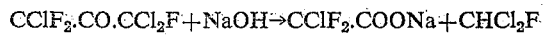

(Equation B)

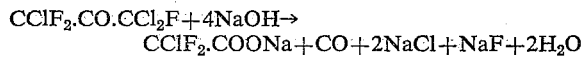

Reaction of Equation A is characterized by alkaline scission of the CCl₂F radical, while the reaction of Equation B is characterized by halogen attack of the CCl₂F radical resulting in decomposition and formation of CO, NaCl, NaF and H₂O as by-products.

*Example 12.*—1.5 mols of NaOH, as a 20% strength water solution, were added to 1.0 mol of CCl₂F.CO.CCl₃, B. P. 163–166° C. over a period of about 60 minutes. During incorporation of the NaOH solution, the reacting mass was maintained at a temperature of about 40° C. After about another hour, during which temperature did not exceed 40° C., the reaction mass was cooled to about 25° C., permitted to settle, and about 96 g. of chloroform were separated by decantation. The chloroform recovered amounted to about 80% of theory in accordance with Equation A above. The remaining aqueous reaction product was found to contain about 0.62 mol of NaCl. In this run about 20% of the original ketone had been subjected to halogen attack resulting in formation of by-products other than a haloform such as CO, NaCl, NaF, and H₂O, as indicated by Equation B. This reaction product containing CCl₂F.COONa in solution was treated with about 1.5 mols of 100% H₂SO₄, in the form of 96% strength sulfuric acid. About 200 grams of benzene were added to extract CCl₂F.COOH. The extract was dried by azeotropic distillation of some of the benzene and all of the water present, and the dried benzene-CCl₂F.COOH extract was fractionally distilled to recover CCl₂F.COOH (B. P. 162° C.) as overhead. The quantity of CCl₂F.COOH recovered amounted to 95% of theory.

*Example 13.*—To one mol of CCl₂F.CO.CCl₂F (B. P. 118–122° C.) were added 2 mols of NaOH, as a 20% strength water solution, over a period of about 90 minutes. During addition of the NaOH, temperature of the mass in the reaction vessel was maintained at about 20° C. About 70 g. (0.67 mol) of CHCl₂F (B. P. 8.9° C.) were evolved in the course of the reaction and were recovered in a Dry-Ice trap. About 2 mols of 100% H₂SO₄, as a 96% sulfuric acid solution, were added to the mass in the reaction vessel. Similarly as in Example 12, the CCl₂F.COOH formed by acidification of the CCl₂F.COONa was benzene extracted, the extract dried, and the quantity of CCl₂F.COOH recovered on final fractional distillation amounted to 93% of theory.

*Example 14.*—One mol of CClF₂.CO.CCl₃ (B. P. about 120° C.) was slowly added while agitating over a period of about 90 minutes to 1.8 mols of NaOH, as 20% strength water solution. During addition of the NaOH solution, the reaction vessel was cooled externally to maintain reaction temperature at about 25° C. After succeeding 1½ hours, the liquid phases formed in the reaction vessel were separated, and about 0.75 mol of CHCl₃ was recovered. Analysis of the remaining aqueous phase showed the presence of 0.76 mol chloride ion, indicating that about 25% of the ketone starting material had been subjected to halogen attack. This aqueous phase containing CClF₂.COONa in solution was acidified by addition of 2 mols of 100% H₂SO₄ as 96% sulfuric acid. CClF₂.COOH was extracted from the acidified liquor with benzene as in Example 12, and CClF₂.COOH (B. P. 121° C.) was recovered from the dried extract in amount equal to 95% of theory.

*Example 15.*—One mol of CClF₂.CO.CCl₂F (B. P. 84.2° C.) was added slowly over a period of about 120 minutes to 220 g. of powdered 85% KOH (3.3 mols of 100% KOH) suspended in about 500 g. of benzene. During incorporation of the KOH, the mass was agitated, and external cooling of the reaction vessel was such as to maintain temperature of the reacting mass at about 30–40° C. Carbon monoxide and CHCl₂F were evolved and about 0.4 mol of CHCl₂F was collected in a Dry-Ice trap. The bulk of the benzene was decanted off from the reacted mass, and the solid relatively slurry-like potassium salt product CClF₂.COOK was dissolved by addition of about 100 g. of water. Analysis of the resulting aqueous solution for chloride and fluoride ions showed that about 60% of the original ketone had been subjected to halogen attack. The aqueous solution was acidified by addition of about 400 g. of 100% H₂SO₄, as 96% sulfuric acid solution. Following benzene extraction, azeotropic removal of water, and distillation similarly as in Example 12, CClF₂.COOH (B. P. 121° C.) was recovered in amount equal to 92% of theory.

*Example 16.*—One mol of CClF₂.CO.CClF₂ (B. P. 44° C.) was added dropwise during one hour to a cooled agitated suspension of 160 g. powdered NaOH (4 mols) in 500 cc. of benzene. Reaction temperature was maintained at about 40° C. Carbon monoxide was evolved. After a further period of about 2 hours, to permit completion of reaction, the reaction product was cooled to about 20° C. and filtered. The solids were dried by heating under vacuum at about 50° C. Analysis showed that the dried solids contained 1.8 mols of NaF and 0.9 mol of NaCl. The solid reaction product containing CClF₂.COONa was treated with 600 g. of 100% H₂SO₄ (6.1 mols), as 96% sulfuric acid solution, and CClF₂.COOH and small amounts of HF and HCl were distilled out. Redistillation of the crude CClF₂.COOH gave 122 g. of CClF₂.COOH, equal to 94% of theory.

*Example 17.*—0.1 mol CF₃.CO.CClF₂ (B. P. 7–11° C.) was slowly distilled into an agitated suspension of 0.4 mol powdered NaOH in 50 cc. of benzene, during which operation temperature of the reacting mass was maintained at about 5° C. The temperature was then maintained at about 30° C. by external heating for a further 2 hours in order to complete the reaction. Most of the benzene was removed by decantation. On analysis, the remaining reacted material, containing CF₃.COONa in solid slurry-like form, showed that most of the ketone had been subjected to halogen attack. The reacted material was subjected to acidification by addition of about 98 g. (1.0 mol) of 100% H₂SO₄, as 96% sulfuric acid solution. The mass was distilled in the presence of the sulfuric acid, and $CF_3.COOH$ (B. P. 71–73° C.) was recovered as overhead in quantity amounting to 90% theory yield.

*Example 18.*—0.25 mols (54 g.) of $CF_3.CO.CCl_3$, B. P. 83.5–84.5° C., were mixed with cooling with 5 g. of water. To this mixture cooled in an ice bath was slowly added 0.5 mol (20 g.) of NaOH dissolved in 60 g. of water over a period of about 30 minutes. During incorporation of the NaOH solution, the reaction mass was maintained at a temperature of about 10–15° C. After the NaOH solution had been added, temperature was raised to about 50° C. and maintained at that point for about an hour to facilitate completion of reaction. The reaction mass containing $CF_3.COONa$ in solution after cooling to about room temperature, was treated by slow addition of 350 g. of 96% sulfuric acid. Chloroform and $CF_3.COOH$ were distilled out, and fractionation of the crude condensate thus obtained gave 27 g. (92% of theory) of $CF_3.COOH$, B. P. 71–73° C., and 24 g. of $CHCl_3$ (80% of theory).

*Example 19.*—0.25 mols (54 g.) of $CF_3.CO.CCl_3$ (B. P. 83.5–84.5° C.) were mixed with cooling with 5 g. of water. To this mixture, cooled in an ice bath, was slowly added 0.37 mol of $NH_3$ in the form of 27% aqueous ammonia over a period of about 30 minutes. During incorporation of the aqueous ammonia, the reaction mass was maintained at a temperature of about 10–15° C. After the ammonia solution had been added, temperature was raised to about 50° C. and maintained at that point for about an hour to facilitate completion of reaction. The reaction mass containing $$CF_3.CO.ONH_4$$

in solution, after cooling to about room temperature, was treated by slow addition of 250 g. of 96% sulfuric acid. Chloroform and $CF_3.COOH$ were distilled out, and fractionation of the crude condensate thus obtained gave 26 g. (90% of theory) of $CF_3.COOH$, (B. P. 71–73° C.) and 26 g. of $CHCl_3$ (85% of theory).

The hereindescribed fluorochloro acids are known in the art. The mono and tri fluoro acids are suitable for use as esterification catalysts, and the mono and di fluoro acids constitute effective solvents for cellulose.

Subject matter of Examples 12–19 inclusive is disclosed and claimed in our copending applications, Serial Nos. 494,236 and 494,274, filed of even date herewith.

This application is a continuation in part of our copending application Serial No. 411,028, filed February 17, 1954, now abandoned.

We claim:

1. The process for making a perchlorofluoroacetone which process comprises reacting at elevated temperature substantially in the range of 30–200° C., a starting material—said starting material comprising a perhalogenated chloroacetone containing zero to not more than 4 fluorine atoms and wherein all halogens are of the group consisting of chlorine and fluorine—with a fluorinating agent while in the presence of antimony pentahalide in amount substantially in the range of 5–60 mol percent based on the total of starting material and antimony pentahalide, and while maintaining said starting material substantially in the liquid phase, and for a period of time sufficient to effect fluorination of a substantial amount of said starting material to cause formation of a perchlorofluoroacetone having a fluorine content greater than that of said starting material, and being selected from the group consisting of $CCl_2F.CO.CCl_3$, $CCl_2F.CO.CCl_2F$, $CClF_2.CO.CCl_2F$, $CClF_2.CO.CClF_2$, $CF_3.CO.CCl_2F$, and $CF_3.CO.CClF_2$.

2. The process for making a perchlorofluoroacetone which process comprises introducing substantially anhydrous HF into a liquid starting material comprising a perhalogenated chloroacetone containing zero to not more than 4 fluorine atoms and wherein all halogens are of the group consisting of chlorine and fluorine, effecting reaction between HF and starting material at temperature substantially in the range of 30–200° C. while in the presence of antimony pentahalide in amount substantially in the range of 5–60 mol percent based on the total of starting material and antimony pentahalide, and while maintaining said starting material substantially in the liquid phase, continuing introduction of HF for a period of time sufficient to effect fluorination of a substantial amount of said starting material to cause formation of a perchlorofluoroacetone having a fluorine content greater than that of said starting material and being selected from the group consisting of $CCl_2F.CO.CCl_3$, $CCl_2F.CO.CCl_2F$, $CClF_2.CO.CCl_2F$, $CClF_2.CO.CClF_2$, $CF_3.CO.CCl_2F$, and $CF_3.CO.CClF_2$.

3. The process of claim 2 in which temperature is substantially in the range of 60–150° C., and the antimony pentahalide is present in amount substantially in the range of about 25–60 mol percent, and time of HF introduction is sufficient to cause formation of reaction product containing a dominant amount of perchlorofluoroacetone having at least three fluorine atoms.

4. The process for making a perchlorofluoroacetone which process comprises introducing substantially anhydrous HF into liquid hexachloroacetone, effecting reaction between HF and hexachloroacetone at temperature substantially in the range of 60–150° C. while in the presence of antimony pentahalide in amount substantially in the range of about 5–60 mol percent based on the total of hexachloroacetone and antimony pentahalide, and while maintaining the reaction mass substantially in the liquid phase, continuing introduction of HF for a period of time sufficient to effect fluorination of a substantial amount of said hexachloroacetone to cause formation of a perchlorofluoroacetone having a fluorine content greater than that of said starting material and being selected from the group consisting of $$CCl_2F.CO.CCl_3$$

$CCl_2F.CO.CCl_2F$, $CClF_2.CO.CCl_2F$, $CClF_2.CO.CClF_2$, $CF_3.CO.CCl_2F$, and $CF_3.CO.CClF_2$.

5. The process of claim 4 in which the antimony pentahalide is present in amount substantially in the range of about 25–60 mol percent, and time of HF introduction is sufficient to cause formation of reaction product containing a dominant amount of perchlorofluoroacetone having at least three fluorine atoms.

6. The process of claim 4 in which the antimony pentahalide is present in amount substantially in the range of about 5–15 mol percent, and time of HF introduction is sufficient to cause formation of reaction product containing a dominant amount of perchlorofluoroacetone having not more than two fluorine atoms.

7. A perchlorofluoroacetone containing one to 5 fluorine atoms and having boiling point in the range of about 7–166° C. at atmospheric pressure.

8. Trifluorotrichloroacetone, $CCl_2F.CO.CClF_2$, having a boiling point of about 84° C. at atmospheric pressure.

9. Asymmetrical trifluorotrichloroacetone, $$CF_3.CO.CCl_3$$

having a boiling point of about 84° C. at atmospheric pressure.

10. Symmetrical tetrafluorodichloroacetone, $$CClF_2.CO.CClF_2$$

having a boiling point of about 44° C. at atmospheric pressure.

11. Tetrafluorodichloroacetone, $CF_3.CO.CCl_2F$, having a boiling point of about 44° C. at atmospheric pressure.

12. Pentafluoromonochloroacetone, $CF_3 \cdot CO \cdot CF_2Cl$, having a boiling point in the range of about 7–11° C. at atmospheric pressure.

References Cited in the file of this patent

UNITED STATES PATENTS

| | | |
|---|---|---|
| 2,510,872 | Downing | June 6, 1950 |
| 2,533,132 | McBee et al. | Dec. 5, 1950 |
| 2,549,988 | Perkins | Apr. 24, 1951 |
| 2,567,569 | McBee et al. | Sept. 11, 1951 |
| 2,614,129 | McBee et al. | Oct. 14, 1952 |
| 2,637,747 | McBee | May 5, 1953 |

UNITED STATES PATENT OFFICE

CERTIFICATE OF CORRECTION

Patent No. 2,853,524 September 23, 1958

Charles B. Miller et al.

It is hereby certified that error appears in the above numbered patent requiring correction and that the said Letters Patent should read as corrected below.

In the grant, lines 2 and 3, and line 12, in the heading to the printed specification, line 5, name of assignee, for "Allied Chemical & Dye Corporation", each occurrence, read -- Allied Chemical Corporation --; column 5, line 15, for "225 grams" read -- 255 grams --.

Signed and sealed this 9th day of December 1958.

(SEAL)
Attest:

KARL H. AXLINE
Attesting Officer

ROBERT C. WATSON
Commissioner of Patents